(12) United States Patent
McFarland et al.

(10) Patent No.: US 6,931,112 B1
(45) Date of Patent: Aug. 16, 2005

(54) USER INVOKED DIRECTED OUTDIAL METHOD AND APPARATUS

(75) Inventors: Stephen McFarland, Groton, MA (US); Louis LeBlanc, Waltham, MA (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 09/652,978

(22) Filed: Aug. 31, 2000

Related U.S. Application Data

(60) Provisional application No. 60/210,923, filed on Jun. 12, 2000.

(51) Int. Cl.[7] ............................ H04M 3/42; H04M 3/00
(52) U.S. Cl. ....................................... 379/202; 379/309
(58) Field of Search ........................ 379/265.02, 88.21, 379/88.09, 67.1, 92.01, 202, 309; 704/3; 717/115

(56) References Cited

U.S. PATENT DOCUMENTS

| | | | |
|---|---|---|---|
| 4,805,209 A | | 2/1989 | Baker, Jr. et al. |
| 4,964,077 A | | 10/1990 | Eisen et al. |
| 5,181,236 A | | 1/1993 | LaVallee et al. |
| 5,214,688 A | * | 5/1993 | Szlam et al. |
| 5,239,617 A | | 8/1993 | Gardner et al. |
| 5,329,581 A | * | 7/1994 | Friedes et al. ............ 379/93.14 |
| 5,467,391 A | * | 11/1995 | Donaghue, Jr. et al. |
| 5,506,890 A | * | 4/1996 | Gupta et al. ............. 379/88.25 |
| 5,511,112 A | * | 4/1996 | Szlam |
| 5,627,884 A | | 5/1997 | Williams et al. |
| 5,727,129 A | | 3/1998 | Barrett et al. |
| 5,796,952 A | | 8/1998 | Davis et al. |
| 5,799,292 A | | 8/1998 | Hekmatpour |
| 5,870,769 A | | 2/1999 | Freund |
| 5,875,296 A | | 2/1999 | Shei et al. |
| 5,875,422 A | * | 2/1999 | Eslambolchi et al. .......... 704/3 |
| 5,877,757 A | | 3/1999 | Baldwin et al. |
| 5,890,164 A | | 3/1999 | Nielson |
| 5,940,614 A | | 8/1999 | Allen et al. |
| 5,951,652 A | | 9/1999 | Ingrassia, Jr. et al. |
| 5,963,635 A | * | 10/1999 | Szlam et al. ................ 379/309 |
| RE36,416 E | * | 11/1999 | Szlam et al. |
| 5,991,395 A | | 11/1999 | Miloslavsky |
| 6,018,724 A | | 1/2000 | Arent |
| 6,047,261 A | | 4/2000 | Siefert |
| 6,310,630 B1 | | 10/2001 | Kulkarni et al. |
| 6,826,745 B2 | * | 11/2004 | Coker et al. ................ 717/115 |

OTHER PUBLICATIONS

"SS7—Signaling System 7", *Webopedia Definition and Links*, http://webopedia.internet.com/TERMS/SS7.html, (Jul. 12, 2000), 1-2.

Hunter, Robert, "Just Plain Rude", *Smart Money Today: Stock Close-Up*: Smart Money.com;, wysiwyg://19http://www.smartmoney.com/smt/colums/stock/index.cfm?story=200 00714,(Jul. 14, 2000), 1-4.

* cited by examiner

*Primary Examiner*—Ahmad F. Matar
*Assistant Examiner*—Thjuan Knowlin
(74) *Attorney, Agent, or Firm*—Schwegman, Lundberg, Woessner & Kluth, P.A.

(57) ABSTRACT

A method including making a plurality of outbound calls to a plurality of called parties from a single device and detecting each called party that answers the call is described.

14 Claims, 6 Drawing Sheets

USER INVOKED DIRECTED OUTDIAL METHOD AND APPARATUS

This application claims the benefit of provisional application No. 60/210,923 filed Jun. 12, 2000.

SUMMARY OF THE INVENTION

A method including making a plurality of outbound calls to a plurality of called parties from a single device and detecting each called party that answers the call is disclosed.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for making a plurality of outbound calls from a single device is disclosed. The method can detect which called parties respond to the call. Based on information associated with each caller, the device can treat each caller as an individual. For example, the device can play different commercial messages to each called party, based on the personal interests of each called party. Furthermore, the device can collect information from each called party, and execute different computer programs based on the information collected.

Thus, from an inbound application, the apparatus can invoke an outbound application and coordinate and synchronize the two applications. In one embodiment, one inbound call launches multiple parallel outbound calls. For example, a call received at a person's office can launch outbound calls to multiple locations, such as the person's home phone, cellular phone, and another office. Each outbound application is treated separately and can be programmed to operate independently of other outbound applications (e.g., outbound calls). If the initial caller hangs up, the application may allow a person to initiate another call.

Figure 1:
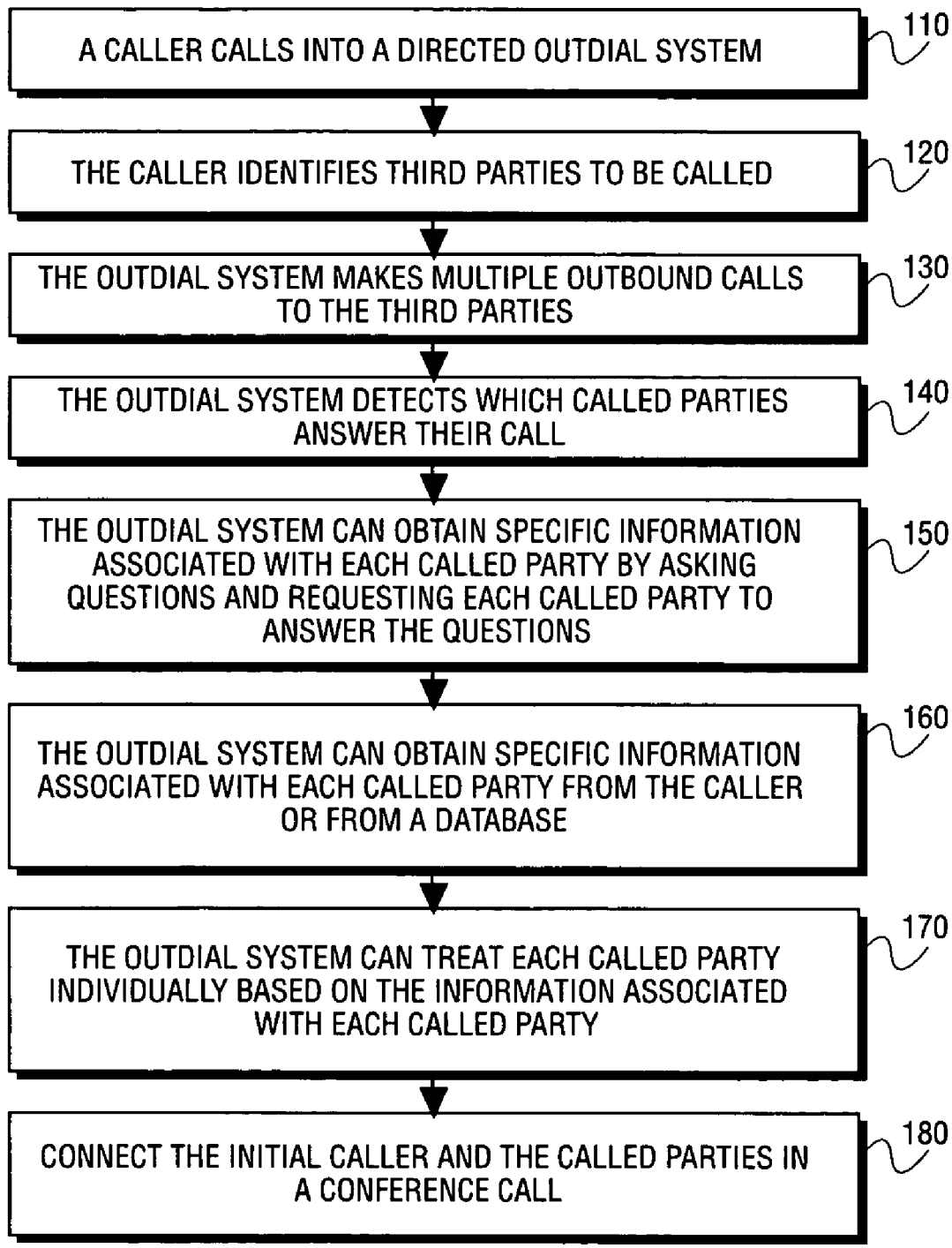
FIG. 1 shows one embodiment for making a plurality of telephone calls from a single device.

FIG. 1 shows one embodiment for making a plurality of telephone calls from a single device. A caller may make an inbound call to a directed outdial system, block 110. The caller may identify a plurality of phone numbers for the system to dial, block 120. In one embodiment, the caller can identify the numbers to the directed outdial system through a voice recognition device, a text to speech device, or a numeric keypad device. The outdial system then makes multiple outbound calls to the third parties, block 130. The outdial system can detect which of the called parties answers the call, block 140. The outdial system may also detect an error, such as a fax machine that answers the call instead of a person, for example. The outdial system can then continue the process with the called parties that answer the call and establish a connection with the outdial system.

The outdial system can treat at least one called party individually based on information associated with that party. The outdial system can obtain information associated with a given called party by asking questions to the called party, for example by accessing a scripted list of questions stored in memory and playing the scripted list of questions to the called party, block 150. The called party is requested to answer the questions. The questions may be answered through a voice recognition device, or a numeric keypad, for example. The outdial system may alternatively obtain specific information associated with each called party from the initial caller, or from a database, block 160.

The outdial system can enable various instances of the script to exchange data, so that any one script can affect the execution of another instance of the script. For example, the system can enable exchanging data between the programs handling the various called parties while the programs are running, to report hang-ups or customer input. Several methods may be used to accomplish this, such as writing to a shared database, shared memory, or shared file.

After obtaining information associated with a given called party, the outdial system can use that information to treat each called party on an individual basis, block 170. For example, the outdial system can send specific messages to a called party based on the information associated with that called party. Different commercial messages may be played to different called parties based on their corresponding personal interests and personal information. The outdial system may also request specific information based on the personal information associated with a given called party.

The outdial system can also connect the called parties that answer the call and the initial caller to a common channel so that all of the parties connected with the outdial system can participate in a conference call, block 180. Furthermore, the flexibility of the system enables the system to connect any combination of answered parties and/or the initial caller in a conference based on input from an individual called party or from the caller.

Figure 2:
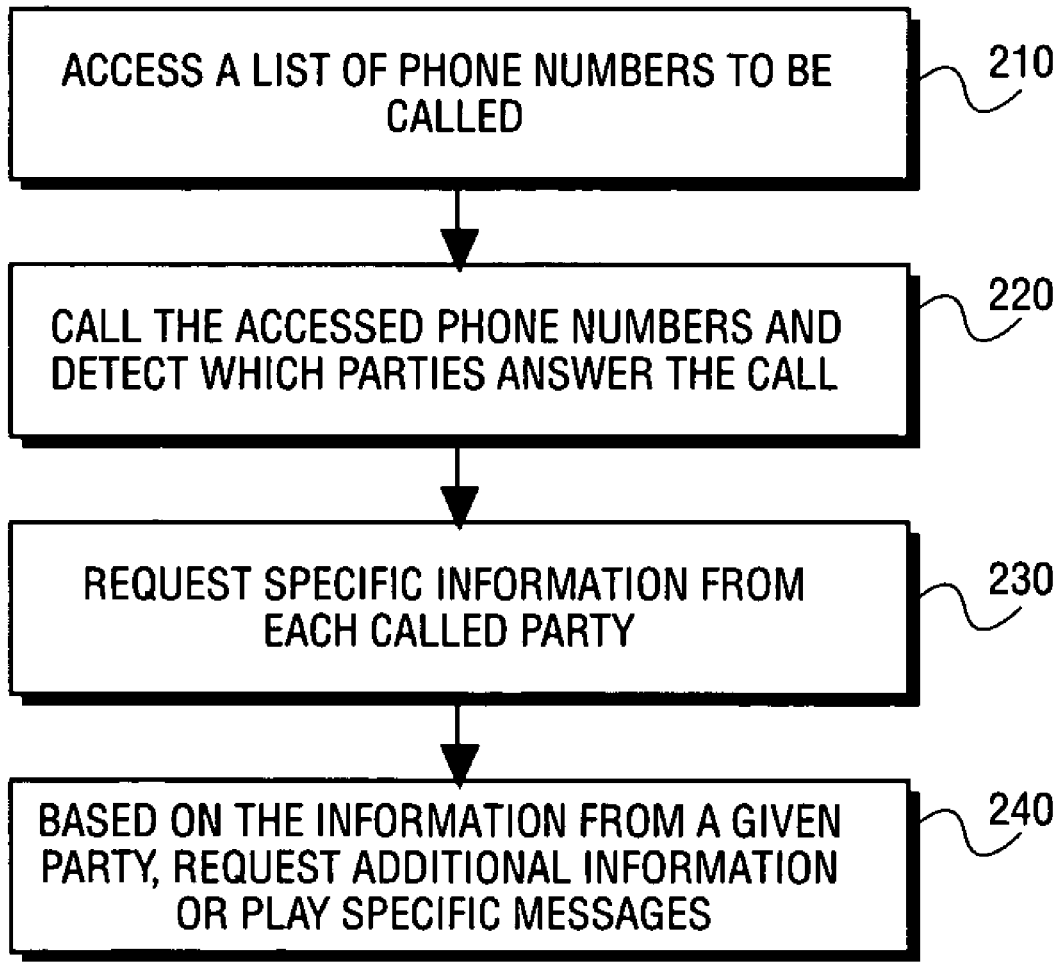
FIG. 2 shows another embodiment of making a plurality of outbound telephone calls from a single device.

FIG. 2 shows another embodiment of making a plurality of outbound telephone calls from a single device. In this embodiment, the outdial system accesses a list of telephone numbers to be called, for example, by reading the list from a database stored in memory, block 210. The outdial system then calls the telephone numbers, and detects which parties answer the call, block 220. The outdial system may then request specific information from each called party block 230, and based on the responses, request additional information or play specific messages, block 240.

For example, if a candidate for public office desires to conduct a survey, the candidate can provide a list of phone numbers of voters within his or her district to the outdial system. The outdial system can then dial those numbers. The voters that answer the phone call are then asked one or more questions. Additional questions may be asked based on the initial answers from the voters. For example, if the candidate is a Democrat, and desires to collect information about Democrats, the first question may be "are you a Democrat?" Those called parties that answer "no" may be played a message that says "thank you for your time." The called parties that answer "yes" may be asked additional follow up questions related to specific issues relevant to the candidate's campaign.

Thus, the outdial system is able to obtain specific information associated with each called party and to treat each called party on an individual basis, even without an initial caller to initiate the process.

Figure 3:
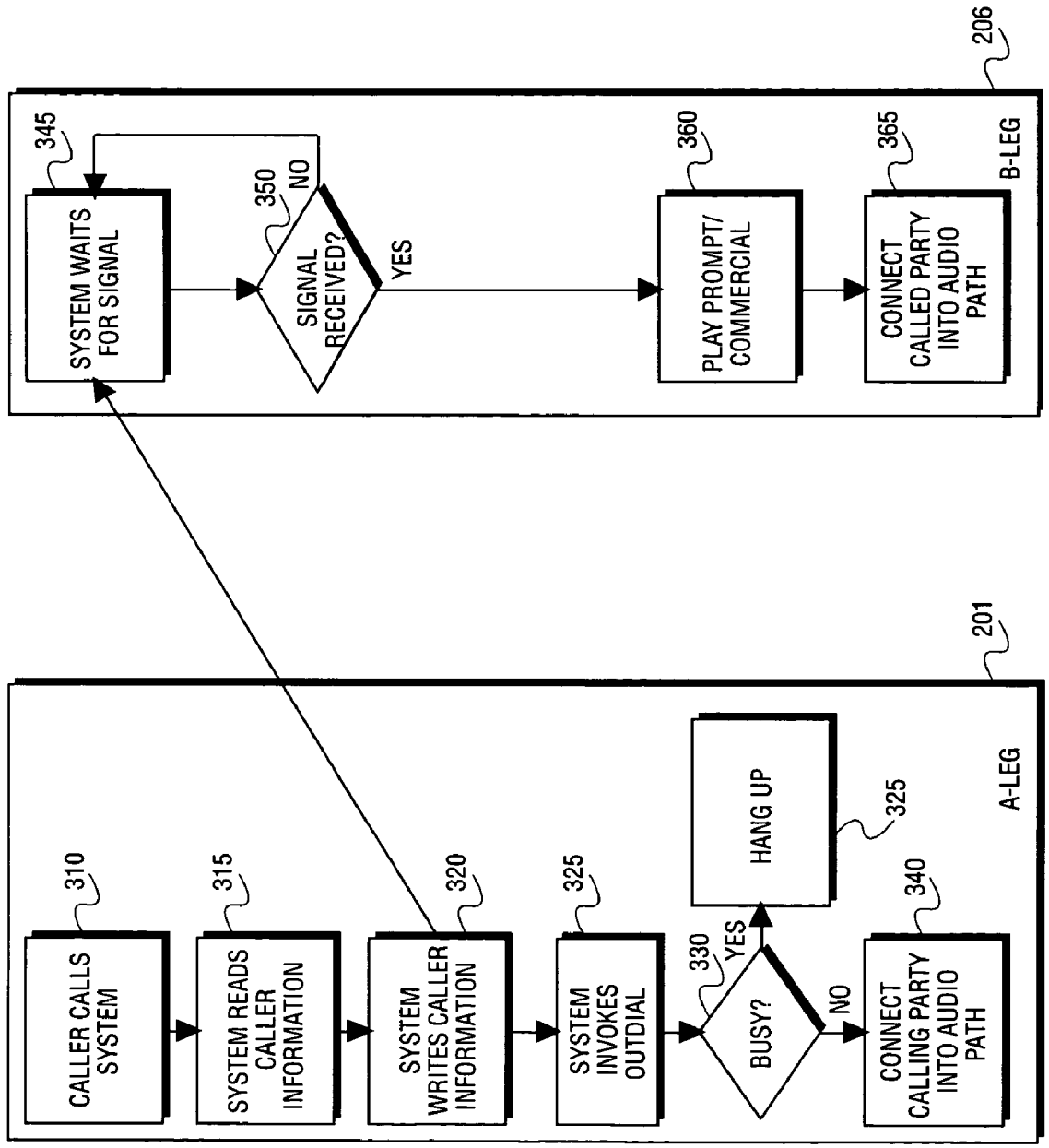
FIG. 3 shows an example of an embodiment of a method used by the outdial system to perform the method of FIG. 1.

FIG. 3 shows an example of an embodiment of a method used by the outdial system to perform the method of FIG. 1. An "A-leg," or inbound, calling program is executed by the system when a caller calls into the system, block 310. The outdial system reads information associated with the caller, block 315, and writes the information into a buffer, block 320. The system then invokes one or more outdial functions, block 325. The outdial function dials the numbers of the parties to be called. If a called number is busy, block 330, the system hangs up, block 335. Otherwise, the system invokes one or more "B-leg," or outbound, calling function for each called party and waits for an answer signal block 345, from each called party to indicate that each party has answered the call. The system then connects with a given called party after an answer signal is received, block 350. The system then may play a message, such as a commercial for example, to each called party, block 360. The message for a given called party may be unique to that party based on information associated with that party. The outdial system may connect the initial caller with the called parties on a single conference path so that the parties may participate in a conference call, block 365.

Figure 4:
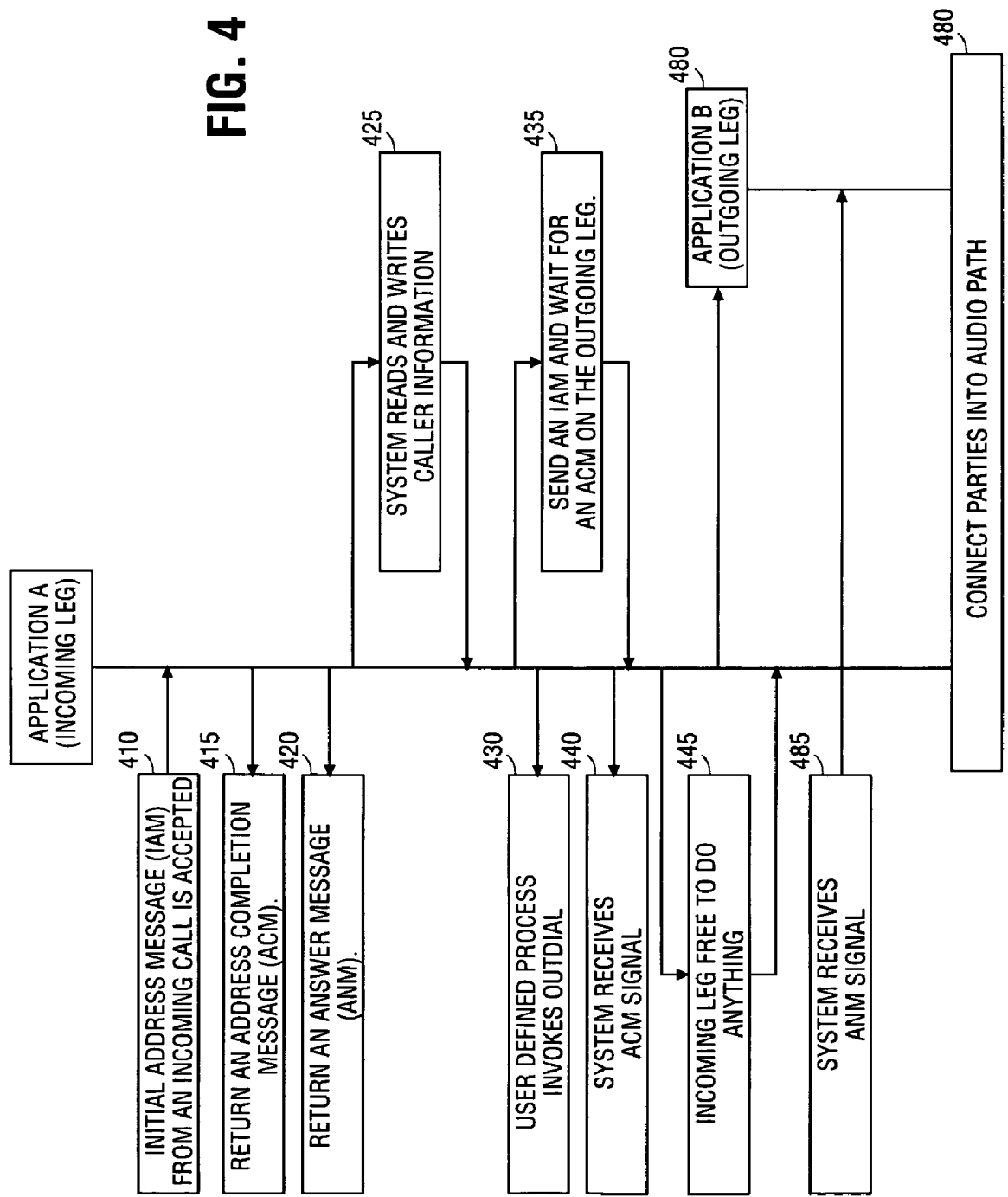
FIG. 4 shows an example embodiment of the signaling used to achieve a successful inbound call to outbound call.

An example embodiment of the signaling used to achieve a successful inbound call to outbound call, or A-leg to B-leg, call is shown in FIG. 4. An initial address message (IAM) from an incoming call is accepted by the A-leg application program, block 410. Then, an address completion message (ACM) is returned block 415, followed by the answer message (ANM) signal, block 420. The system then prepares caller information, such as ISUP (integrated services user part) parameters to be used by the B-leg application program, block 425. An outdial function is then invoked block 430, which sends an IAM, such as multiple telephone numbers, for example, across a telephone network, block 435. Then, an ACM is returned, block 440. The B-leg application program then controls the outdial process block 480, and waits for an ANM answer message from each called party, block 485. After one or more ANM signals have been returned, the A-leg and the B-leg may be bridged using a conference path so that all connected parties can participate in a conference call, block 490.

Figure 5:
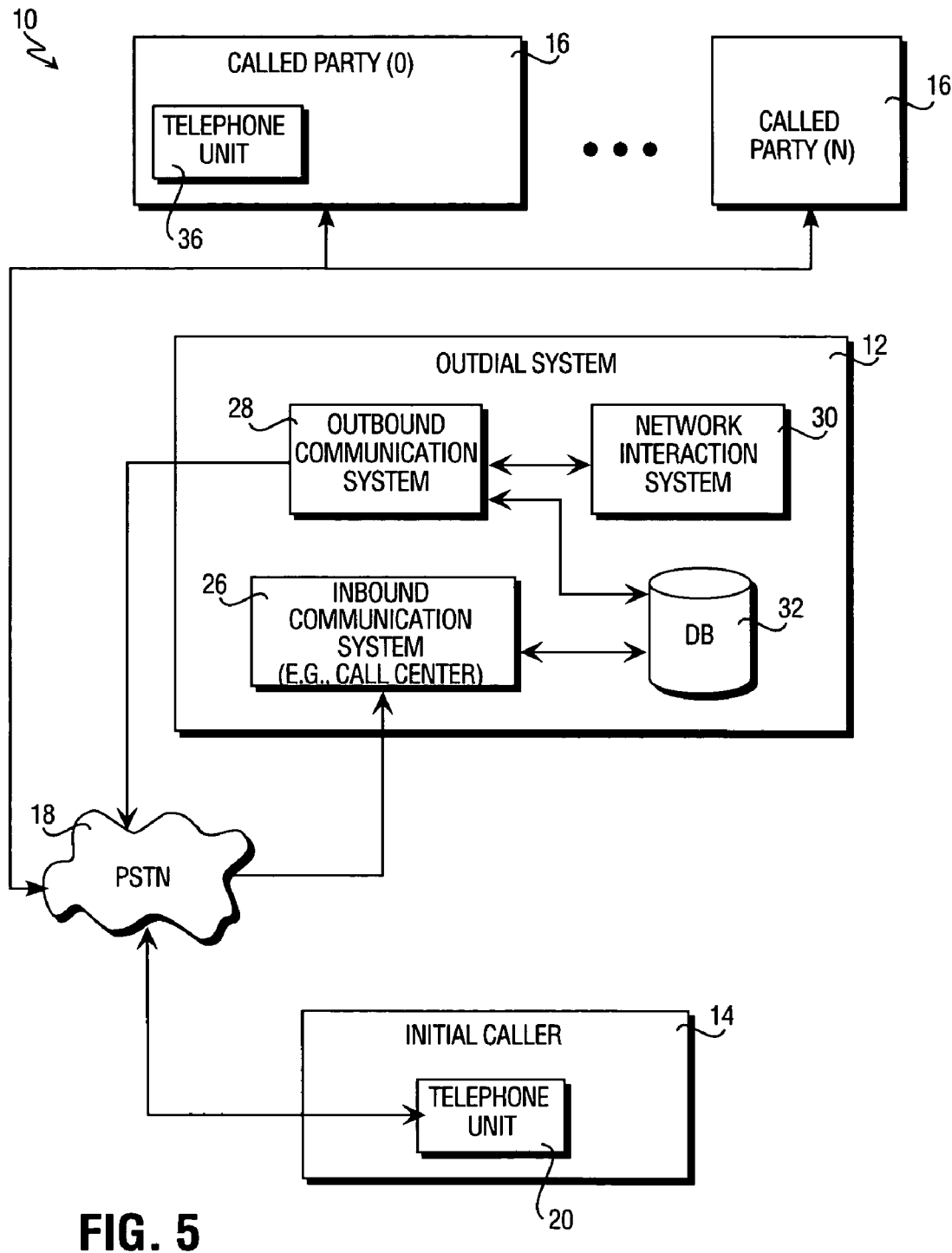
FIG. 5 is a block diagram illustrating an exemplary interaction environment.

FIG. 5 is a block diagram illustrating an exemplary interaction environment 10, facilitated by an outdial system 12. The outdial system 12 may be any system that is capable of receiving, transmitting, queuing, routing, or otherwise processing a telephone call.

The interaction environment 10 is further shown to include an initial caller 14 (e.g., a human or automated entity) that is coupled to the outdial system 12. The interaction environment 10 further includes one or more called parties 16 (e.g., human agents or automated entities), that are capable of answering outbound calls and responding to requests communicated by the initial caller 14, or directed to provide information to the initial caller 14. Each of the called parties 16 is furthermore coupled to the interaction system 12 that serves to facilitate, broker and otherwise control interactions between the initial caller 14 and called parties 16.

The initial caller 14 is shown to be coupled to the customer interaction system 12 by a network, namely a Public Switched Telephone Network (PSTN) 18 via which the initial caller may engage in, for example, telephone-based communications. To this end, the initial caller 14 is shown to have access to telephone equipment 20.

The outdial system 12 is shown to include a number of sub-systems, namely an inbound communication system 26, and an outbound communication system 28. The inbound communication system 26 operates to receive inbound calls received at the interaction system 12 via the PSTN 18. The inbound communication system 26 may include, for example, Automatic Call Distributor (ACD), call center, PBX, or other telephone call processing device. The outbound communication system 28 (e.g., an outbound dialer system) operates to initiate communications with third parties 16 via the PSTN 18. For example, the outbound communication system 28 may perform an outbound telephone call campaign that includes automatically dialing a predetermined list of telephone numbers, detecting a customer pick up and, responsive to the customer pick up, communicating 16.

Each of the inbound communication system 26, and the outbound communication system 28 are shown to be coupled, and have access to, a database 32 that stores information concerning the various called parties 16 and initial caller 14.

Figure 6:
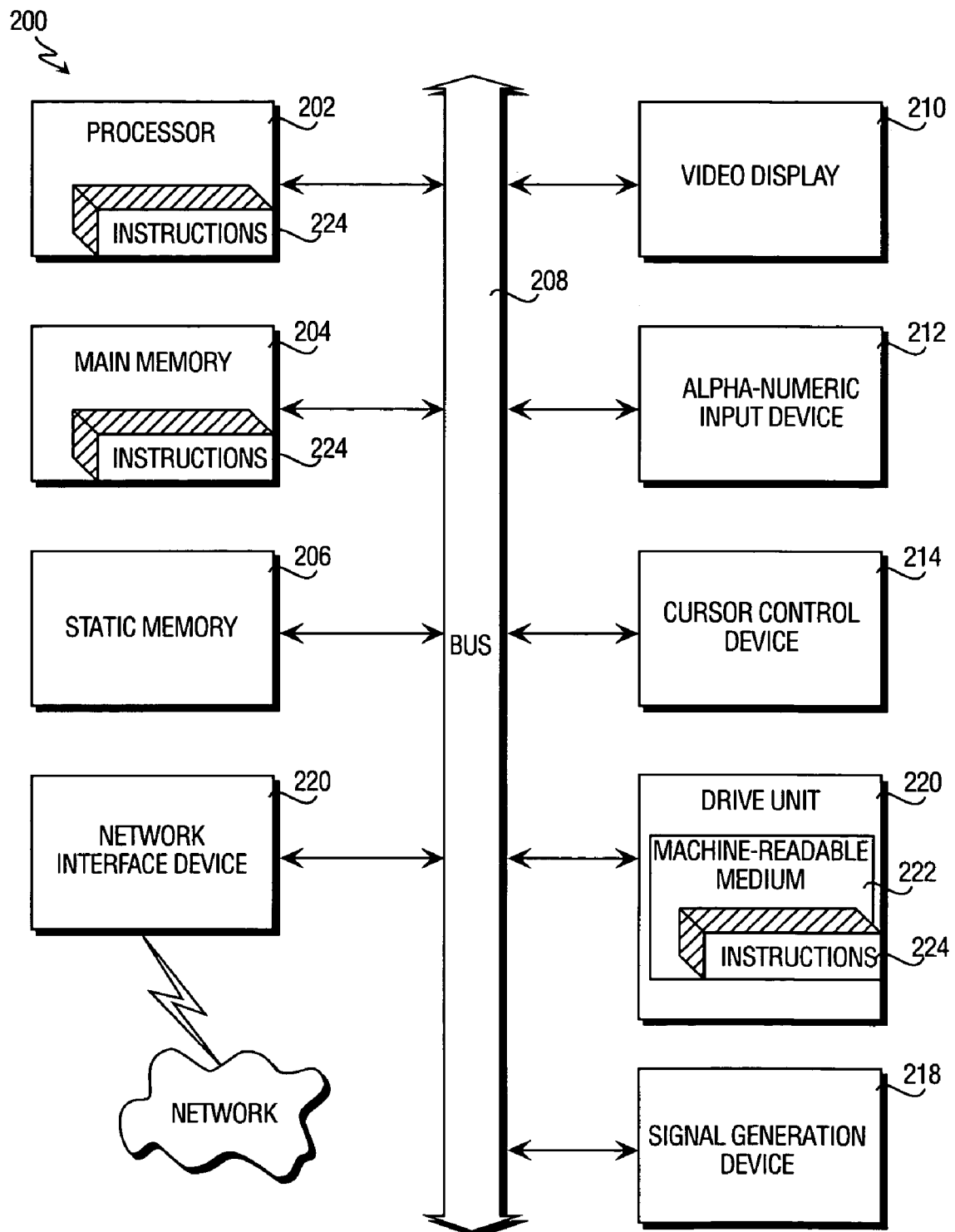
FIG. 6 shows a diagrammatic representation of a computer.

FIG. 6 shows a diagrammatic representation of a machine in the exemplary form of a computer system 600 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 602, a main memory 204 and a static memory 606, which communicate with each other via a bus 608. The computer system 600 may further include a video display unit 610 (e.g., a liquid crystal display (LCD) or a cathode ray tube (CRT)). The computer system 600 also includes a alphanumeric input device 612 (e.g. a keyboard), a cursor control device 614 (e.g. a mouse), a disk drive unit 616, a signal generation device 618 (e.g. a speaker) and a network interface device 620.

The disk drive unit 616 includes a machine-readable medium 622 on which is stored a set instructions (i.e., software) 624 embodying any one, or all, of the methodologies described above. The software 624 is also shown to reside, completely or at least partially, within the main memory 604 and/or within the processor 602. The software 624 may further be transmitted or received via the network interface device 620. For the purposes of this specification, the term "machine-readable medium" shall be taken to include any medium which is capable of storing or encoding a sequence of instructions for execution by the machine and that causes the machine to perform any one of the methodologies of the present invention. The term "machine-readable medium" shall accordingly be taken to included, but not limited to, solid-state memories, optical and magnetic disks, and carrier wave signals.

Thus, a method and system for user involved directed outdial have been described. The user involved directed outdial provides a user with the ability to invoke an outbound application with information provided by an inbound application, as well as the ability to easily transfer ISUP parameters form the inbound call to the outbound call. In addition, directed outdial error reporting in an SS7 telephone network environment is provided. This allows services such as free phone or phone relay, while preserving the initial caller's identification information (e.g., "caller ID information").

Although the present invention has been described with reference to specify exemplary embodiments, it will evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   making a plurality of outbound calls to a plurality of called parties from a single device, wherein the plurality of called parties includes at least a first called party and a second called party;
   detecting which called parties answer the call;
   playing a first message to the second called party;
   determining a second message to send to the first called party responsive to receiving information that is associated with the second called party; and
   playing the second message to the first called party, wherein information that is associated with the second called party includes information regarding a user action of the second called party.

2. The method of claim 1, wherein the information associated with the second called party includes answer information regarding whether the second called party answered the outbound call to the second called party.

3. The method of claim 1, wherein the information associated with the second called party includes customer input from the second called party.

4. The method of claim 1, wherein the information associated with the second called party includes database information concerning the second called party.

5. The method of claim 1, wherein the information associated with the second called party includes responses to requests for information from the second called party.

6. The method of claim 5, wherein the response to requested information includes an answer to a personal question.

7. The method of claim 1, wherein the message is a question.

8. The method of claim 1, further including connecting the first called party to a conference call.

9. The method of claim 1, wherein the determining includes executing an instance of a first script for the first called party that operates independently of a second script for the second called party.

10. The method of claim 9, further comprising the first script communicating with the second script.

11. The method of claim 1, wherein the determining includes executing a first computer program for the first called party that operates independently of a second computer program for the second called party.

12. The method of claim 11, further comprising the first computer program communicating with the second computer program.

13. An apparatus comprising:
    a first means to make a plurality of outbound calls to a plurality of called parties from a single device, wherein the plurality of called parties includes at least a first called party and a second called party;
    a second means to detect which called parties answer the call;
    a third means to play a first message to the second called party
    a fourth means to determine a second message to send to the first called party responsive to receipt of information that is associated with the second called party;
    a fifth means to play the second message to the first called party, wherein information that is associated with the second called party includes information regarding a user action of the second called party.

14. A machine readable medium storing a set of instructions that, when executed by the machine, cause the machine to:
    make a plurality of outbound calls to a plurality of called parties from a single device, wherein the plurality of called parties includes at least a first called party and a second called party;
    detect which called parties answer the call;
    play a first message to the second called party;
    determine a second message to send to the first called party responsive to receipt of information that is associated with the second called party; and
    play a second message to the first called party, wherein information that is associated with the second called party includes information regarding a user action of the second called party.

* * * * *